United States Patent
Watabe (10) Patent No.: US 11,703,682 B2
(45) Date of Patent: Jul. 18, 2023

(54) APPARATUS CONFIGURED TO DISPLAY SHARED INFORMATION ON PLURALITY OF DISPLAY APPARATUSES AND METHOD THEREOF

(71) Applicant: CANON KABUSHIKI KAISHA, Tokyo (JP)

(72) Inventor: Hiroyuki Watabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 17/178,937

(22) Filed: Feb. 18, 2021

(65) Prior Publication Data

US 2021/0263308 A1     Aug. 26, 2021

(30) Foreign Application Priority Data

Feb. 20, 2020    (JP) ................. 2020-027360

(51) Int. Cl.
| | | |
|---|---|---|
| *G02B 27/00* | (2006.01) | |
| *G06T 19/00* | (2011.01) | |
| *G06F 3/0484* | (2022.01) | |
| *G09G 3/00* | (2006.01) | |
| *G06F 3/14* | (2006.01) | |
| *G02B 27/01* | (2006.01) | |

(52) U.S. Cl.
CPC ....... *G02B 27/0093* (2013.01); *G06F 3/0484* (2013.01); *G06F 3/1454* (2013.01); *G06T 19/006* (2013.01); *G09G 3/001* (2013.01); *G02B 27/017* (2013.01); *G02B 2027/014* (2013.01)

(58) Field of Classification Search
None
See application file for complete search history.

(56) References Cited

U.S. PATENT DOCUMENTS

| | | | | |
|---|---|---|---|---|
| 10,162,412 B2 * | 12/2018 | Nishizawa | .............. | G06F 3/013 |
| 2011/0221750 A1 * | 9/2011 | Sato | ................. | G02B 30/27 |
| | | | | 345/419 |
| 2012/0320047 A1 * | 12/2012 | Yanagita | ............... | G06F 3/0418 |
| | | | | 345/419 |
| 2013/0002661 A1 * | 1/2013 | Tanaka | ................. | H04N 13/128 |
| | | | | 345/173 |
| 2016/0189429 A1 * | 6/2016 | Mallinson | ............ | H04N 13/344 |
| | | | | 345/633 |
| 2021/0063746 A1 * | 3/2021 | Aiki | .................... | G02B 27/017 |

FOREIGN PATENT DOCUMENTS

| | | | |
|---|---|---|---|
| JP | 2011010126 A | | 1/2011 |
| JP | 2012252663 A | * | 12/2012 |
| JP | 2013134706 A | | 7/2013 |

* cited by examiner

*Primary Examiner* — Jwalant Amin
(74) *Attorney, Agent, or Firm* — Canon U.S.A., Inc. IP Division (57) ABSTRACT

An apparatus connected to a first display apparatus of head mounted type including two or more displays and to a second display apparatus includes a determination unit configured to determine an image to be displayed on a display that corresponds to a dominant eye of a wearer wearing the first display apparatus among the two or more displays of the first display apparatus based on information about the dominant eye of the wearer of the first display apparatus and a control unit configured to perform control to display the determined image on the second display apparatus.

16 Claims, 10 Drawing Sheets

APPARATUS CONFIGURED TO DISPLAY SHARED INFORMATION ON PLURALITY OF DISPLAY APPARATUSES AND METHOD THEREOF

BACKGROUND OF THE DISCLOSURE

Field of the Disclosure

The aspect of the embodiments relates to a technique for sharing content displayed on a head-mounted display (HMD) with an external display apparatus.

Description of the Related Art

There have been known systems that enable a head mounted display (HMD) wearer to experience virtual reality (VR) or mixed reality (MR).

In a case where there is an audience other than the HMD wearer, the system shares an image viewed by the HMD wearer by displaying the image on another display apparatus different from the HMD. In Japanese Patent Application Laid-Open No. 2011-10126, an image viewed by a HMD wearer is presented to an audience other than the HMD wearer through another display apparatus different from the HMD. Especially, in Japanese Patent Application Laid-Open No. 2011-10126, an image to be displayed on the other display apparatus different from the HMD can be selected from an image for the left eye that is displayed on the HMD, an image for the right eye that is displayed on the HMD, and a panoramic image generated by combining the image for the left eye and the image for the right eye.

With the above-described system, in a case where a virtual object in a virtual-reality space viewed by the HMD wearer is near the point of view of the HMD wearer, the content of the image for the left eye differs greatly from that of the image for the right eye. Thus, in a case where one of the image for the left eye and the image for the right eye is to be displayed to the audience, if the image that is mainly viewed by the observer is not selected as appropriate, the content viewed by the HMD wearer cannot be shared with the audience. Further, in order to generate a panoramic image by combining the image for the left eye and the image for the right eye as in Japanese Patent Application Laid-Open No. 2011-10126, a display apparatus with a resolution higher than or equal to that of the HMD is needed, and this leads to an increase in size and price of the system.

The aspect of the embodiments is directed to a technique that increases usability of a function of displaying an image viewed by a HMD wearer on another display apparatus different from the HMD to share the image with an audience.

SUMMARY OF THE DISCLOSURE

According to an aspect of the embodiments, an information processing apparatus connected to a first display apparatus of head mounted type including two or more displays and to a second display apparatus includes a determination unit configured to determine an image to be displayed on a display that corresponds to a dominant eye of a wearer wearing the first display apparatus among the two or more displays of the first display apparatus based on information about the dominant eye of the wearer of the first display apparatus and a control unit configured to perform control to display the determined image on the second display apparatus.

Further features of the disclosure will become apparent from the following description of exemplary embodiments with reference to the attached drawings.

DESCRIPTION OF THE EMBODIMENTS

Various exemplary embodiments of the disclosure will be described in detail below with reference to the drawings. It should be noted that each configuration described in the exemplary embodiments below is a mere example and the scope of the disclosure is not necessarily limited to the specific configurations.

Exemplary embodiments of the disclosure will be described below with reference to the attached drawings. In a first exemplary embodiment, a description will be given of an example of an information processing apparatus that determines an image to be displayed on a display apparatus for an audience based on information about a dominant eye input by a user by operating a graphical user interface (GUI).

An exemplary embodiment in which the above-described information processing apparatus is applied to an information processing system for enabling an observer wearing a head-mounted display (HMD) on the head to experience a virtual space will be described below. In a case where the HMD is an optical see-through HMD or a video see-through HMD that can capture images of a real space, the system is a system that enables an observer to experience not a virtual space but a mixed reality space. In the present exemplary embodiment, the term "observer" refers to a HMD wearer, and the term "audience" refers to a person who does not wear a HMD and views a mixed reality space using another display apparatus different from the HMD.

Figure 1A:
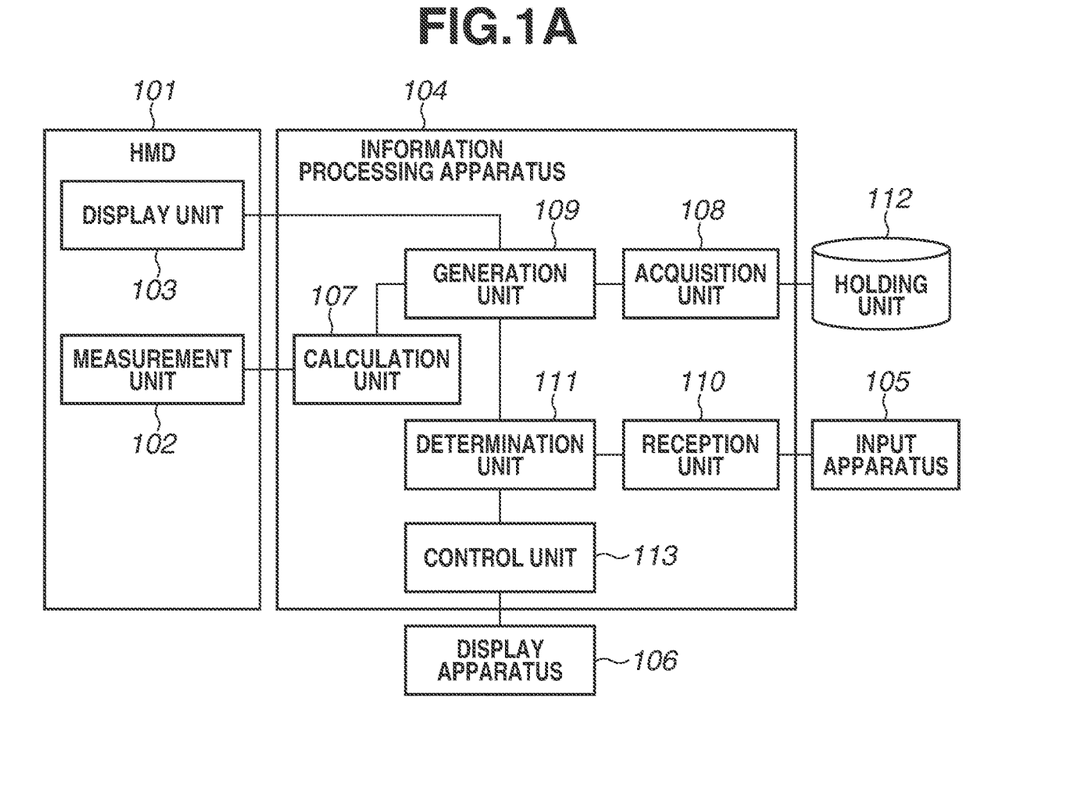
FIGS. 1A and 1B are block diagrams illustrating an example of a system configuration.

First, an example of a configuration of the system according to the present exemplary embodiment will be described below with reference to a block diagram in FIG. 1A. The system according to the present exemplary embodiment includes as hardware a head-mounted display (HMD) 101 (first display apparatus), an information processing apparatus 104, an input apparatus 105, a display apparatus 106 (second display apparatus), and a holding unit 112. Wired and/or wireless connections are established between the HMD 101 and the information processing apparatus 104, between the information processing apparatus 104 and the input apparatus 105, between the information processing apparatus 104 and the display apparatus 106, and between the information processing apparatus 104 and the holding unit 112 to enable data communication with each other.

The system further includes a function of combining captured video images acquired from an image capturing unit of the HMD 101 using position and orientation information about the HMD 101 and definition information about a virtual object and outputting the combined image as a mixed reality image to allow an observer to experience a mixed reality space. This function can be realized by a publicly-known technique, so that descriptions thereof are omitted in the present exemplary embodiment.

First, the HMD 101 will be described below. A person to be an observer wears the HMD 101 on the head to experience a virtual space or a mixed reality space through the HMD 101. While the HMD 101 is described as an example of a head-mounted display apparatus in the present exemplary embodiment, a head-mounted display apparatus of another type is also applicable. Further, not only a head-mounted display apparatus but also a display apparatus of a different type that is to be used by an observer for viewing to experience a virtual-reality space or a mixed reality space, such as a hand-held display apparatus, are applicable.

A display unit 103 includes a display screen for the right eye and a display screen for the left eye. The display screen for the right eye displays video images (image and text) based on video signals for the right eye that are transmitted from the information processing apparatus 104. The display screen for the left eye displays video images (image and text) based on video signals for the left eye. The display screen for the right eye is provided to be in front of the right eye of the observer wearing the HMD 101 on the head, whereas the display screen for the left eye is provided to be in front of the left eye of the observer wearing the HMD 101 on the head. Therefore, video images based on video signals for the right eye are presented to the right eye of the observer wearing the HMD 101 on the head, whereas video images based on video signals for the left eye are presented to the left eye of the observer. The number of display screens for the right eye and the number of display screens for the left eye of the display unit 103 do not have to be one, and the display unit 103 can include two or more display screens for each eye. For example, the display unit 103 can include a plurality of display screens to be observed by the right eye and a plurality of display screens to be observed by the left eye. As described above, the display apparatus in the present exemplary embodiment displays parallax images with respect to the right and left eyes of a user, and the user views both images at the same time to observe a visual scene with both eyes.

A measurement unit 102 functions as a receiver in a magnetic field sensor system and measures the position and orientation of the HMD 101. The magnetic field sensor system will be described below with reference to FIG. 2. A magnetic field generation apparatus 201 functions as a transmitter in the magnetic field sensor system and is fixed in a predetermined position in a real space and generates a magnetic field circumferentially. Operations of the magnetic field generation apparatus 201 are controlled by a controller 202, and operations of the controller 202 are controlled by the information processing apparatus 104.

Figure 2:
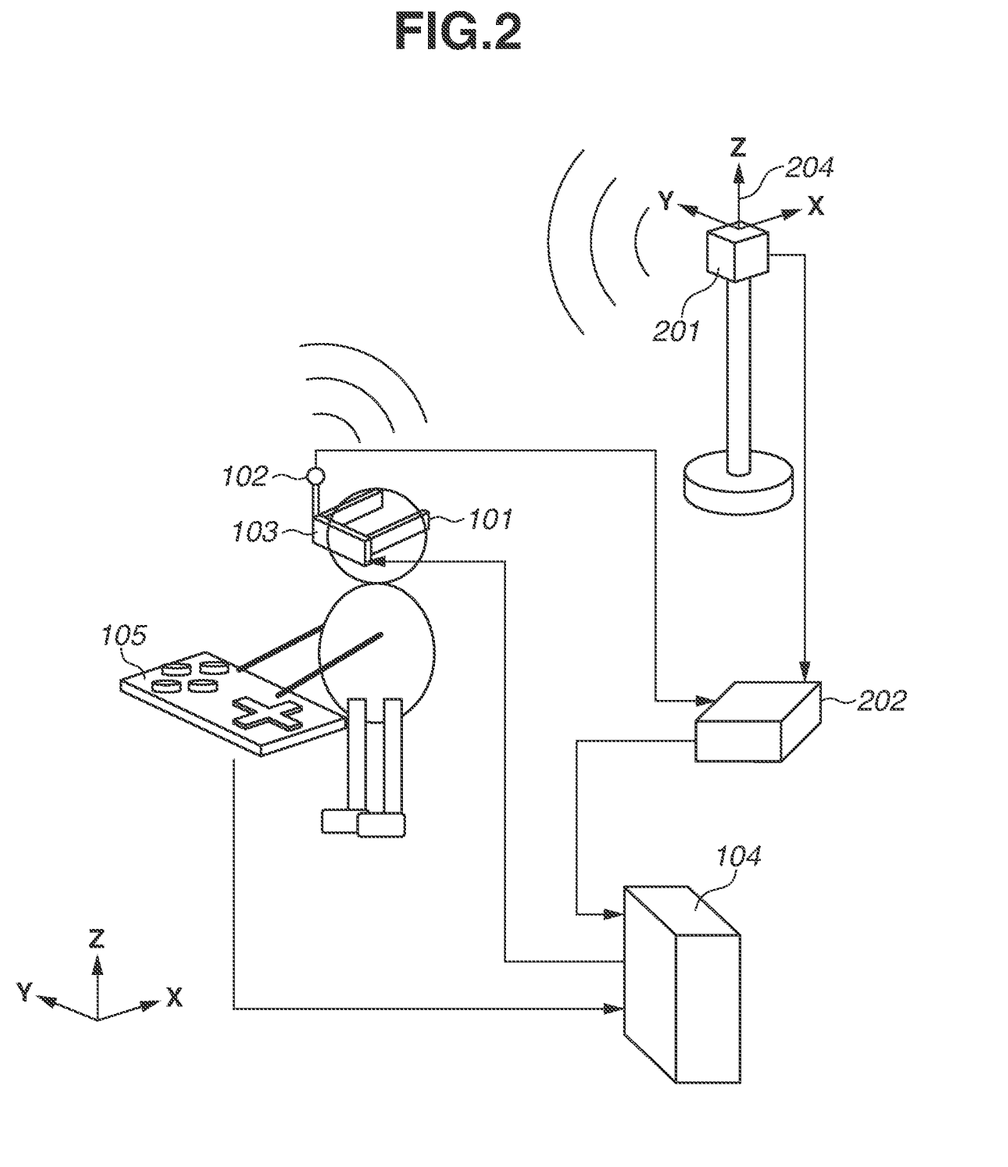
FIG. 2 is a diagram illustrating a magnetic field sensor system.

The measurement unit 102 is fixed to the HMD 101 and measures physical quantities of the position and orientation of the apparatus (the HMD 101). In the present exemplary embodiment, the measurement unit 102 measures a change in a magnetic field based on the position and orientation of the apparatus in the magnetic field generated by the magnetic field generation apparatus 201 and transmits the measurement result to the controller 202. The controller 202 generates a signal value indicating the position and orientation of the measurement unit 102 in a sensor coordinate system 204 based on the measurement result and transmits the generated signal value to the information processing apparatus 104. The sensor coordinate system 204 is a coordinate system that has an origin point at the position of the magnetic field generation apparatus 201 and three axes intersecting each other at the origin point as x-, y-, and z-axes. In place of the magnetic field sensor system, an ultrasonic sensor system or an optical sensor system can be used, or a combination of the systems can be used.

Next, the input apparatus 105 will be described below. As illustrated in FIG. 2, the input apparatus 105 is an operation apparatus that an observer operates to input various types of operation input. The input apparatus 105 includes, for example, a directional key for moving a target to be moved upward, downward, rightward, or leftward, such as a cursor, and includes buttons for inputting instructions, such as an instruction to determine or an instruction to cancel. A user interface of any form that is configured to input various operation instructions described below to the information processing apparatus 104 is applicable to the input apparatus 105. Specifically, the input apparatus 105 can be an apparatus such as a mouse or a keyboard or can be an apparatus that recognizes a gesture or voice of an observer or another user and inputs an operation instruction corresponding to the recognized gesture or voice. Further, the input apparatus 105 can be a combination of the above-described apparatuses. The input apparatus 105 can be operated by not only the observer wearing the HMD 101 but also another user (e.g., one of the audience).

Next, the holding unit 112 will be described below. The holding unit 112 holds various types of information input to the information processing apparatus 104, such as information about each virtual object in the virtual space. The information held by the holding unit 112 includes information that is input manually by the observer or another user, information that is acquired from an external device, or both. The information about each virtual object contains information for drawing the virtual object, such as the position and orientation of the virtual object in a virtual space coordinate system, shape information about the virtual object, color information, information indicating a texture, information defining a texture, and a texture. The virtual space coordinate system refers to a coordinate system that has an origin point at a single point in the virtual space and three axes intersecting each other at the origin point as x-, y-, and z-axes. In the case in FIG. 2, the virtual space coordinate system corresponds to a coordinate system 203. Further, the information held by the holding unit 112 includes various types of image information and text information about the virtual space and the virtual object. The holding unit 112 can be an external apparatus that is connected to the information processing apparatus 104 and inputs information held via a predetermined interface to the information processing apparatus 104. Alternatively, the holding unit 112 can be included in the information processing apparatus 104.

Next, the display apparatus 106 will be described below. The display apparatus 106 includes a display screen for displaying one of a video signal for the right eye and a video signal for the left eye based on set dominant eye information among video images based on video signals transmitted from the information processing apparatus 104 to the display unit 103. The display apparatus 106 can be a dedicated display apparatus for the display function, or a tablet terminal or another information processing apparatus can be connected to the system to use a display unit of the connected tablet terminal or information processing apparatus.

Figure 1B:
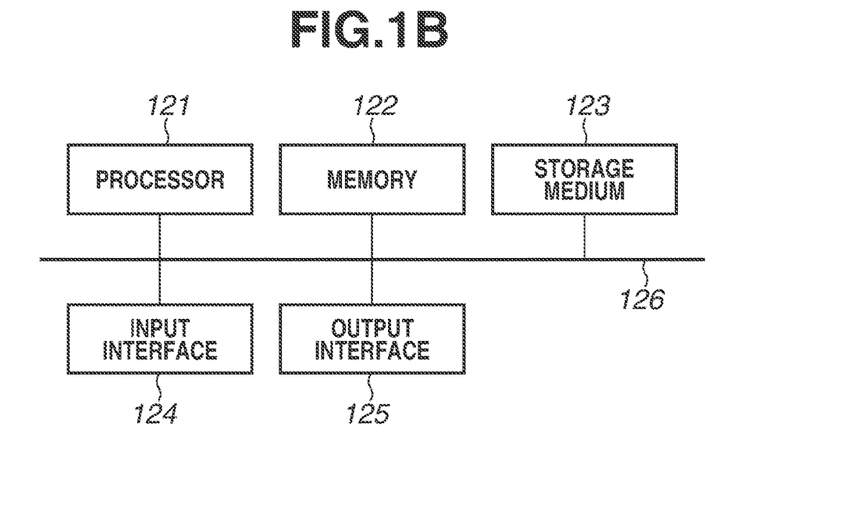

Next, the information processing apparatus 104 will be described below. The information processing apparatus 104 includes a computer apparatus, such as a personal computer (PC), or a mobile terminal apparatus, such as a smartphone or a tablet terminal apparatus. FIG. 1B is a diagram illustrating a basic configuration of a computer that can be used as the information processing apparatus 104 according to the present exemplary embodiment. In FIG. 1B, a processor 121 is, for example, a central processing unit (CPU) and controls operations of the entire computer. A memory 122 is, for example, a random access memory (RAM) and temporarily stores programs and data. A computer-readable storage medium 123 is, for example, a hard disk or a compact disk (CD) read-only memory (ROM) (CD-ROM) and stores programs and data on a long-term basis. In the present exemplary embodiment, a program for realizing functions of units that is stored in the storage medium 123 is read onto the memory 122. Then, the processor 121 operates according to the program on the memory 122 to realize the functions of the functional units described below.

Figure 3:
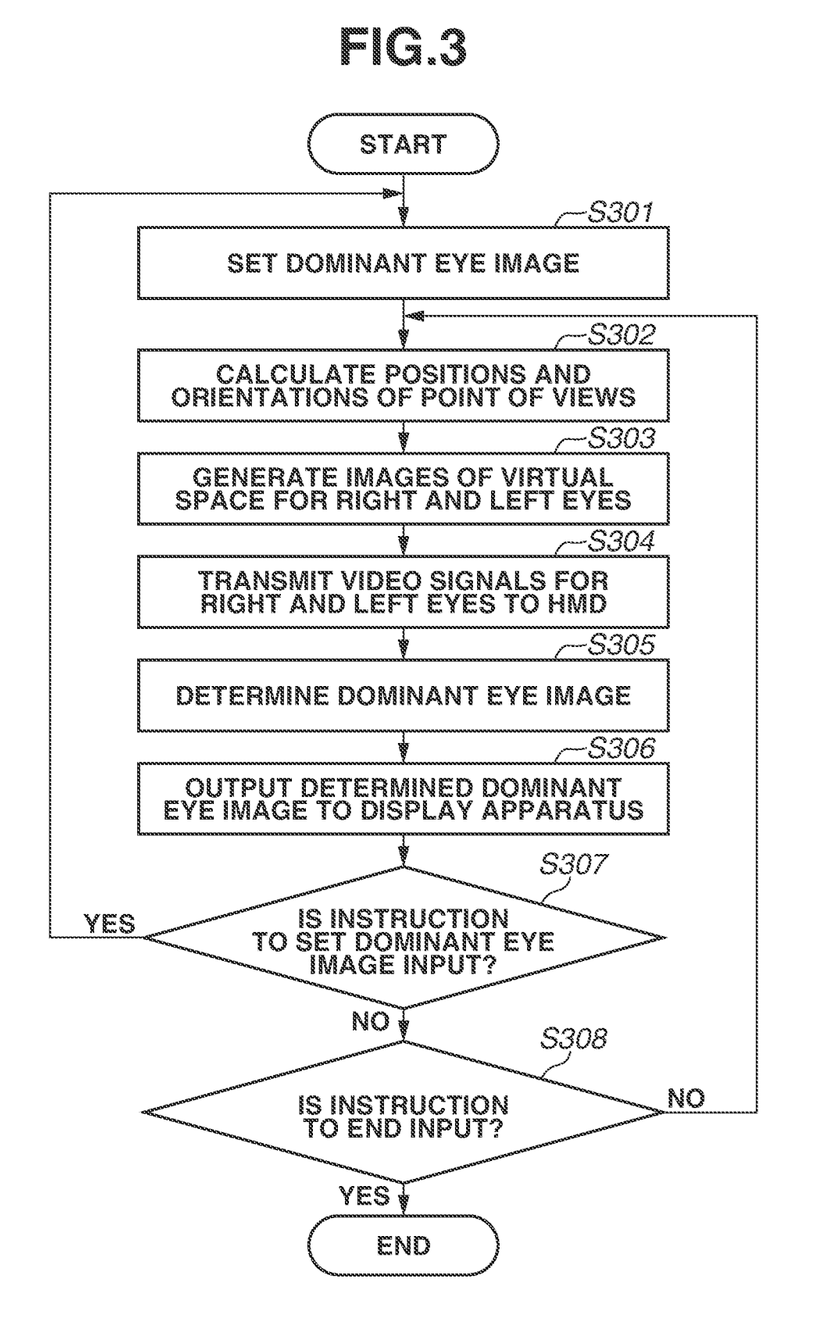
FIG. 3 is a flowchart illustrating operations of functional units of an information processing apparatus.

Operations of the functional units of the information processing apparatus 104 according to the present exemplary embodiment will be described below with reference to a flowchart in FIG. 3. The flowchart in FIG. 3 illustrates a process of outputting video signals of images in the virtual space to the display screen of the HMD 101 for the right eye, the display screen of the HMD 101 for the left eye, and the display apparatus 106. In the present exemplary embodiment, for example, if the function of sharing an image by the HMD 101 and another display apparatus to allow the observer to experience a mixed reality space is started, the process is started from step S301. Hereinafter, each step of the flowchart will be described below with the character "S" at the beginning of each step number.

Figure 4A:
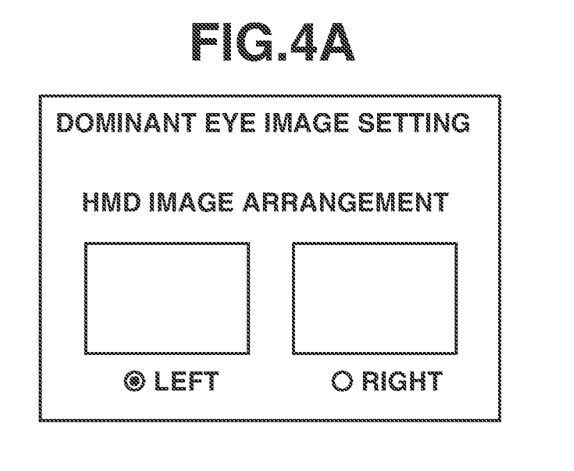
FIGS. 4A to 4C are diagrams illustrating examples of a graphical user interface (GUI).

In step S301, a reception unit 110 receives an operation instruction input by the observer or another user by operating the input apparatus 105. A determination unit 111 sets a dominant eye image to be displayed on the display apparatus 106 based on the received operation instruction. For example, the observer sets a dominant eye image by operating a graphical user interface (GUI) illustrated in FIG. 4A via the input apparatus 105. Setting information about the set dominant eye image is registered in the memory 122 of the information processing apparatus 104. There may be a case where an operation instruction is not received in step S301, and in this case, a dominant eye image that is preset to the information processing apparatus 104 can be used.

Figure 4B:
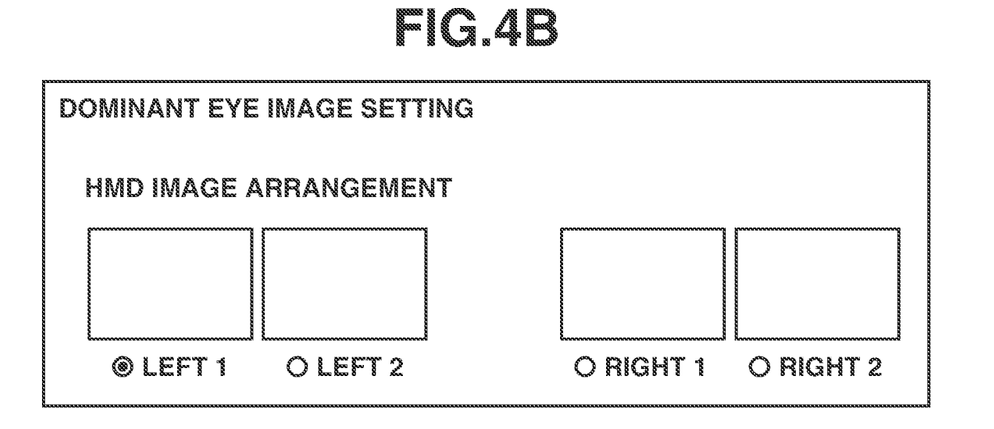

Further, FIG. 4B illustrates a GUI in a case where there is a plurality of display screens for the right eye and a plurality of display screens for the left eye. Even in this case, the user can select an image that is considered as the most suitable image by operating the input apparatus 105. An example of a case where there is a plurality of display screens for the right eye and a plurality of display screens for the left eye is a case where display screens are arranged to increase an angle of view to retain a wider field of view for both the right and left eyes.

In step S302, a calculation unit 107 calculates positions and orientations of a right point of view and a left point of view of the HMD 101 in the virtual space coordinate system with the display screen for the right eye being the right point of view and the display screen for the left eye being the left point of view. First, transformation information for transforming positions and orientations in the sensor coordinate system 204 into positions and orientations in the virtual space coordinate system is calculated in advance and registered in advance in the information processing apparatus 104. Further, a relative positional relationship (bias for the right eye) between the measurement unit 102 and the display screen for the right eye and a relative positional relationship (bias for the left eye) between the measurement unit 102 and the display screen for the left eye are also calculated in advance and registered in advance in the information processing apparatus 104.

Thus, after acquiring signal values indicating the position and orientation of the measurement unit 102 in the sensor coordinate system 204 from the measurement unit 102 (in the case in FIG. 2, via the controller 202), the calculation unit 107 transforms the position and orientation indicated by the signal values into the position and orientation in the virtual space coordinate system using the transformation information. Then, the calculation unit 107 adds the bias for the right eye to the transformed position and orientation to calculate the position and orientation of the right point of view in the virtual space coordinate system. Similarly, the calculation unit 107 adds the bias for the left eye to the transformed position and orientation to calculate the position and orientation of the left point of view in the virtual space coordinate system. Hereinafter, the right point of view and the left point of view are sometimes collectively referred to simply as "point of view" in descriptions common to the right point of view and the left point of view.

Various methods other than the above-described method can be employed to calculate the position and orientation of the point of view in the virtual space coordinate system. For example, an image capturing apparatus is attached to the HMD 101, and the position and orientation of the image capturing apparatus are calculated based on image feature amounts in images captured by the image capturing apparatus. The calculated position and orientation are transformed using the transformation information. Then, the bias for the right eye is added to the transformed position and orientation to calculate the position and orientation of the right point of view in the virtual space coordinate system, and the bias for the left eye is added to the transformed position and orientation to calculate the position and orientation of the left point of view in the virtual space coordinate system. Further, the positions and orientations of the left point of view and the right point of view can be calculated separately without using the relative positions and orientations.

In step S303, a generation unit 109 first configures a virtual space in which each virtual object is arranged using virtual object information acquired from the holding unit 112 by an acquisition unit 108. Alternatively, a virtual object to be arranged can be preset to the information processing apparatus 104, or the observer can set a virtual object to be arranged in generating an image of the virtual space. Then, the generation unit 109 generates an image of the virtual space viewed from the positions and orientations of the right point of view and the left point of view that are calculated by the calculation unit 107. A publicly-known technique can be used to generate an image of the virtual space viewed from the point of view, so that descriptions thereof are omitted.

In step S304, the generation unit 109 transmits a video signal of an image for the right eye to the display screen for the right eye and transmits a video signal of an image for the left eye to the display screen for the left eye. Consequently, the image of the virtual space for the right eye is presented in front of the right eye of the observer, and the image of the virtual space for the left eye is presented in front of the left eye of the observer.

In step S305, the determination unit 111 receives the video images transmitted in step S304 and determines the dominant eye image set in step S301 among the two images for the left and the right. In step S306, a control unit 113 outputs the determined dominant eye image to display the output dominant eye image on the display apparatus 106. Consequently, the audience other than the observer can check the video image viewed by the observer with the dominant eye, by viewing the display apparatus 106.

In step S307, whether the observer or another user operates the input apparatus 105 and inputs an instruction to set a dominant eye image again is determined. In a case where an instruction to set a dominant eye image again is input (YES in step S307), the processing returns to step S301. On the other hand, in a case where an instruction is not input (NO in step S307), the processing proceeds to step S308.

In step S308, whether the observer or another user operates the input apparatus 105 and inputs an instruction to end the process is determined. In a case where an instruction to end the process is input (YES in step S308), the process in the flowchart in FIG. 3 is ended. On the other hand, in a case where an instruction is not input (NO in step S308), the processing returns to step S302.

As described above, according to the present exemplary embodiment, a dominant eye image selected using the GUI via which the user can compare the images to be displayed correspondingly to the right and left eyes is displayed on another display apparatus different from the HMD 101. Thus, a video image that is mainly recognized in the brain of the HMD wearer is shared with the audience. Especially in a case where the virtual object in the virtual-reality space that is viewed by the HMD wearer is near the point of view of the HMD wearer, a video image close to the video image recognized by the HMD wearer is shared.

Modified Example of First Exemplary Embodiment

In the first exemplary embodiment, the dominant eye image is displayed on the display apparatus for the audience as a video image corresponding to the dominant eye of the observer based on the user selection from the two or more images corresponding to the right and left eyes. In the present modified example, an example in which a "dominant eye" is directly selected without using images on a GUI will be described below. The information processing apparatus 104 determines an image corresponding to a set "dominant eye" and displays the determined image on the display apparatus for the audience. Hereinafter, descriptions of those that are similar to the first exemplary embodiment are omitted as appropriate, and mainly differences will be described below.

Figure 5:
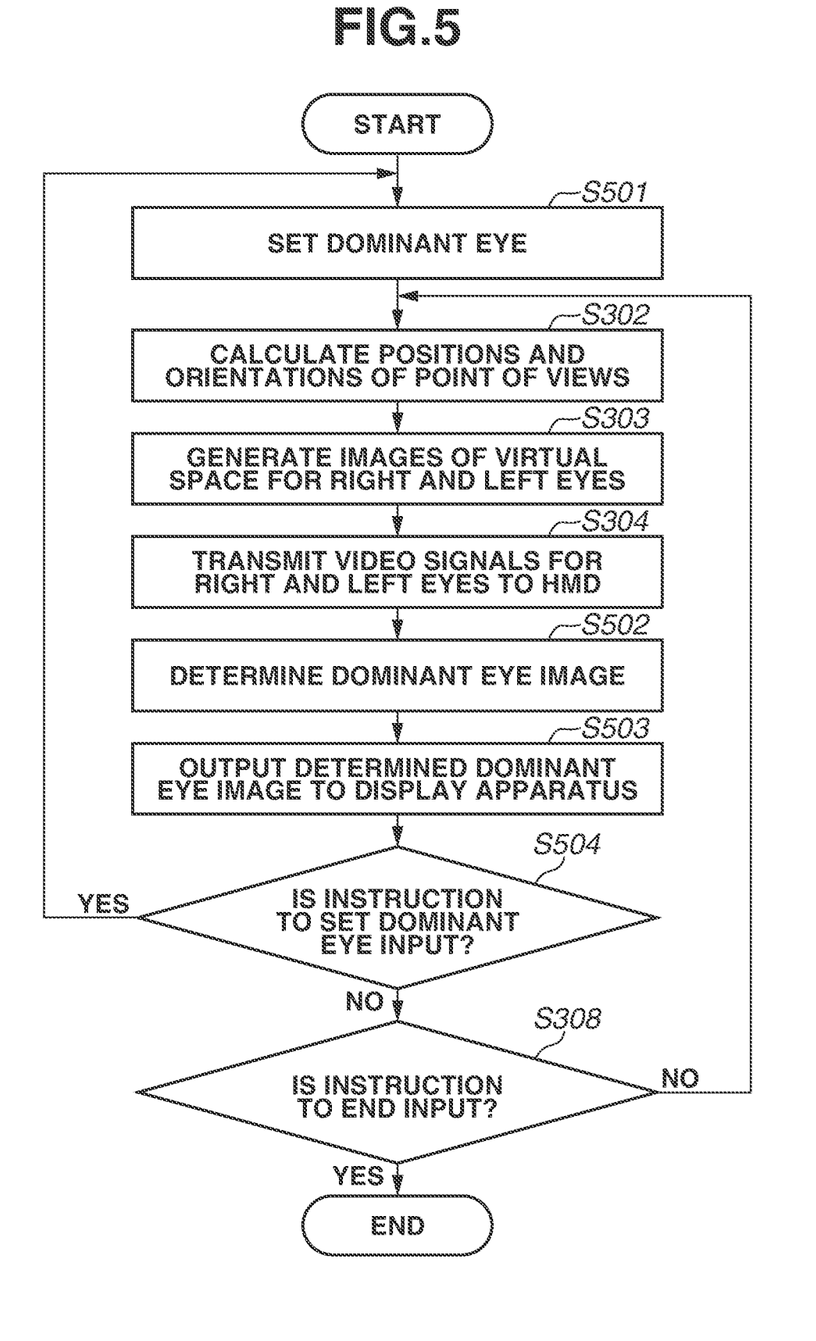
FIG. 5 is a flowchart illustrating operations of the functional units of the information processing apparatus.

A difference between the system according to the modified example and the first exemplary embodiment is an operation of the determination unit 111. Operations of the functional units of the information processing apparatus 104 according to the modified example will be described below with reference to a flowchart in FIG. 5. FIG. 5 is a flowchart illustrating a process of the information processing apparatus 104 according to the modified example. Descriptions of the steps that are similar to those in FIG. 3 are omitted.

In step S501, the reception unit 110 receives an operation instruction input by the observer or another user by operating the input apparatus 105. The determination unit 111 sets dominant eye information about the observer based on the received operation instruction. For example, the observer sets a dominant eye of the observer by operating the GUI in FIG. 4C via the input apparatus 105. Information about the set dominant eye is registered in the information processing apparatus 104. There may be a case where a dominant eye is not set in step S501, and in this case, dominant eye information that is registered in advance in the information processing apparatus 104 can be used.

In the modified example, in step S304, the generation unit 109 transmits a video signal of an image for the left eye to the display screen for the left eye, and the processing proceeds to step S502. In step S502, the determination unit 111 determines a video image to be displayed on the display apparatus 106 from the video images transmitted in step S304 using the information about the dominant eye set in step S501. For example, in a case where the left eye is set as the dominant eye, a video image that is displayed on the display screen for the left eye positioned in front of the left eye of the observer wearing the HMD 101 on the head is determined as a dominant eye image. Further, in a case where the display screen for the left eye of the HMD 101 is divided into a plurality of display screens, images of the eyes of the observer are captured, and a line-of-sight direction is detected from the captured images, and the video image displayed on the display screen viewed by the observer is determined as a dominant eye image. Alternatively, the information processing apparatus 104 can determine a video image displayed on the nearest display screen to the dominant eye as a dominant eye image. In this case, the nearest display screen can be a display screen that is registered in advance in the information processing apparatus 104 as the nearest display screen to the set dominant eye. In order to do so, the nearest display screen to the right eye of the observer and the nearest screen to the left eye of the observer are to be calculated in advance for the registration based on the structure of the HMD 101.

In step S503, the control unit 113 transmits the dominant eye image determined in step S502 to the display apparatus 106. Consequently, the audience other than the observer can check the video image viewed by the dominant eye of the observer by checking the display apparatus 106.

In step S504, whether the observer or another user operates the input apparatus 105 and inputs an instruction to set a dominant eye is determined. In a case where an instruction to set a dominant eye is input (YES in step S504), the processing returns to step S501. On the other hand, in a case where the instruction is not input (NO in step S504), the processing proceeds to step S308.

Figure 4C:
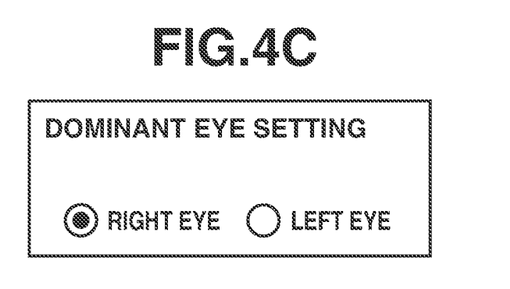

According to the modified example described above, the dominant eye is selectable on the GUI, and the system displays a suitable dominant eye image on the external display apparatus based on information about the selected dominant eye. There may be a situation where the images for the right and left eyes that are displayed as selectable choices on the GUI do not have a difference that can be a basis for selection. In a case where the operator is to determine which one of the eyes is the dominant eye as in the modified example, a simple GUI as in FIG. 4C is also effective.

In the first exemplary embodiment and the modified example of the first exemplary embodiment, a video image corresponding to the dominant eye of the observer is displayed on the display apparatus for the audience based on information set by explicit input. On the contrary, in a second exemplary embodiment, the system determines a dominant eye based on a difference between an image to be displayed to the right eye and an image to be displayed to the left eye and displays a video image corresponding to the dominant eye of the observer on the display apparatus for the audience. Mainly differences from the first exemplary embodiment will be described below, and descriptions of those that are similar to the first exemplary embodiment are omitted as appropriate.

While detailed descriptions are omitted in the first exemplary embodiment, the system is to allow the observer to experience a mixed reality space, so that the generation unit 109 includes a function of generating an image of a virtual object (three-dimensional model) based on virtual object information held by the holding unit 112. In the generated image, the virtual object is represented at a position and an orientation based on the position and orientation of the HMD 101 that are measured by the measurement unit 102. Further, an operation of the determination unit 111 in the system according to the second exemplary embodiment is different from that in the first exemplary embodiment. Further, in the second exemplary embodiment, the determination unit 111 determines an image in which the center of gravity of a reference (a guide for the HMD wearer) virtual object is near a center of the image as an image corresponding to the dominant eye among an image of the virtual space from the right point of view and an image of the virtual space from the left point of view that are generated by the generation unit 109. The center of the image is calculated from a value calculated by dividing the vertical size of the image by two and a value calculated by dividing the horizontal size of the image by two.

Figure 6A:
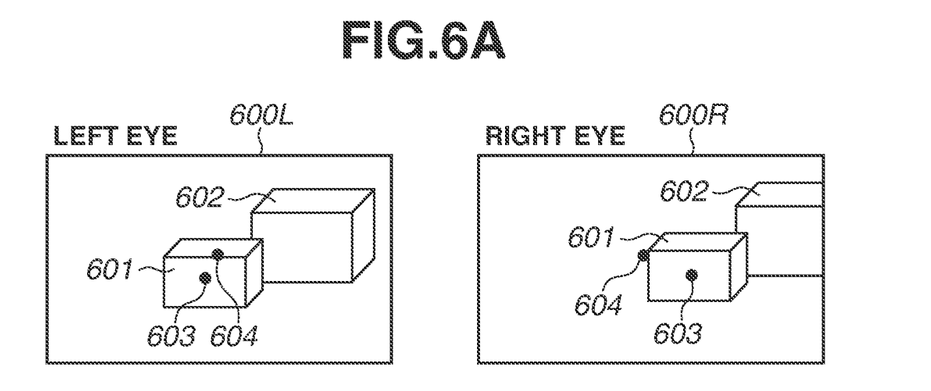
FIGS. 6A and 6B are diagrams illustrating examples of images that are processed by the system to determine a dominant eye image.

FIG. 6A illustrates an example. In FIG. 6A, an image 600L is an image to be presented to the display screen of the HMD 101 for the left eye, and an image 600R is an image to be presented to the display screen of the HMD 101 for the right eye. Virtual objects 601 and 602 are displayed on both the display screen for the right eye and the display screen for the left eye. In order to realize a stereoscopic view of a single object when the object is viewed by both eyes, the images that are respectively displayed with respect to the right and left eyes have a difference due to parallax as illustrated in FIG. 6A.

An image center 604 and a center of gravity 603 of the virtual object 601 are specified in each of the images 600L and 600R. In a case where an image in which the center of gravity 603 of the virtual object 601 being a reference virtual object is present nearer to the image center 604 is determined, the determined image is the image 600L displayed on the display screen for the left eye. Thus, in the example illustrated in FIG. 6A, the image 600L is the image determined as an image corresponding to the dominant eye in the present exemplary embodiment. The determined image 600L is then output as a video signal to the display apparatus 106. In such a manner, an image corresponding to a dominant eye is determined without explicit setting by the user.

The reference virtual object can be determined in advance by the information processing apparatus 104 or by the observer or another user. Further, an image in which not the center of gravity of the virtual object but a certain point on the virtual object that is predetermined by the observer or another user is present near the center of the image can be selected as an image corresponding to the dominant eye. Alternatively, an image in which the center of the image is present near the center of gravity of a plurality of points on the virtual object that are predetermined by the user can be selected as an image corresponding to the dominant eye.

A description will be given of an issue that may arise in a case where the process of determining a dominant eye image according to the first and second exemplary embodiments is not performed and an image corresponding to the dominant eye cannot be displayed on another display apparatus different from the HMD 101. For example, in a case where the audience views an image of the image 600R that does not correspond to the dominant eye on the other display apparatus different from the HMD 101, the audience cannot observe the entire virtual object 602 by viewing the image on the display apparatus. However, since the HMD wearer can see the image of the image 600L of the left eye being the dominant eye, the HMD wearer can observe the entire virtual object 602. Since the image 600R observed by the audience and the image 600L viewed by the HMD wearer are different, there arises an issue that the HMD wearer and the audience cannot share visual information. In order to solve the issue, the above-described method is employed to display an image corresponding to the dominant eye in the present exemplary embodiment.

Figure 7:
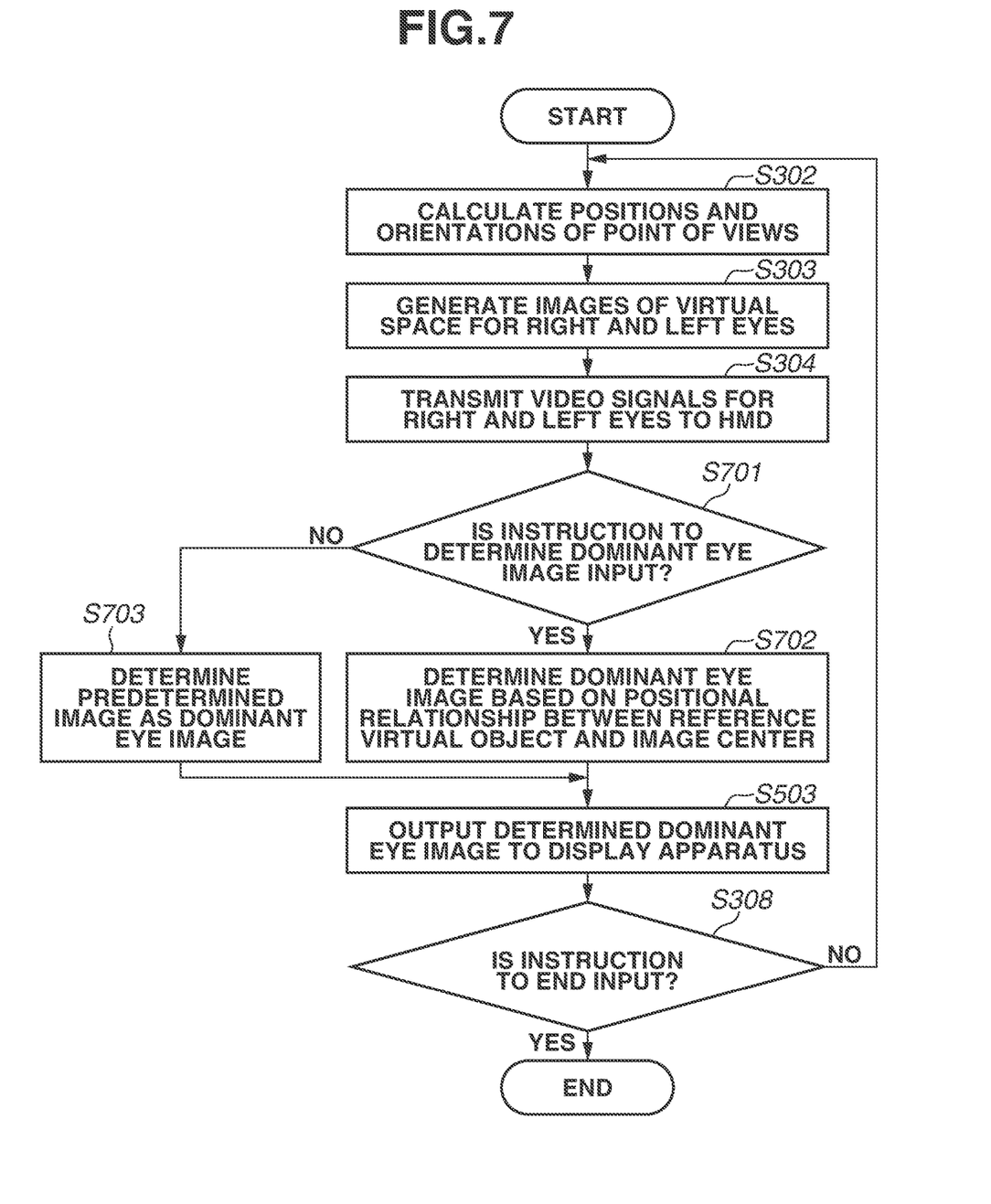
FIG. 7 is a flowchart illustrating operations of the functional units of the information processing apparatus.

FIG. 7 is a flowchart illustrating a process of the information processing apparatus 104 according to the second exemplary embodiment. Descriptions of each step similar to that in the flowchart in FIG. 5 are sometimes omitted.

In the second exemplary embodiment, similarly, the process in the flowchart in FIG. 7 is started if, for example, the function of sharing an image with the HMD 101 and another display apparatus is activated to enable the observer to experience a mixed reality space. In the second exemplary embodiment, however, the GUI for setting a dominant eye in step S501 is not displayed, and then in step S302, the processing for calculating the position and orientation of the HMD 101 is started. Further, in the second exemplary embodiment, after the generation unit 109 transmits the video signal of the image for the left eye to the display screen for the left eye in step S304, the processing proceeds to step S701.

In step S701, it is determined whether the observer or another user operates the input apparatus 105 and inputs an instruction to cause the system to determine a dominant eye image. In a case where an instruction to cause the system to determine a dominant eye image is input (YES in step S701), the processing proceeds to step S702. On the other hand, in a case where the instruction to cause the system to determine a dominant eye image is not input (NO in step S701), the processing proceeds to step S703.

In step S702, the determination unit 111 performs the processing described above as an example with reference to FIG. 6A and determines an image corresponding to a dominant eye image. Prior to the processing, the guidance "please view the reference virtual object so that the reference virtual object is at the center of the field of view" can be displayed on the image of the virtual space.

Further, the following conditions can be added as conditions for the selection in the processing of step S702.
  A movement amount of each translated component (X, Y, Z) of each point of view within a threshold period is less than or equal to a threshold value.
  The distance between each point of view and a point of the reference virtual object is less than or equal to a threshold value.
  The distance between the center of the image of one of the points of view and a point of the reference virtual object on the image is less than or equal to a threshold value. In a case where the foregoing conditions are not satisfied, an image corresponding to the dominant eye image does not have to be determined. In a case where an image corresponding to the dominant eye image is not determined, the generation unit 109 can generate an image to display the message "dominant eye image is not selectable" or "selection of a dominant eye image is being executed" on the virtual space image. On the other hand, in a case where a dominant eye image is determined, the message "dominant eye image has been selected" can be displayed on the virtual space image.

In step S703, a predetermined image is determined as a dominant eye image. For example, an image that is used as a dominant eye image when the system is previously used or a preset image is determined. In a case where a dominant eye image is determined in step S702 or S703, the processing proceeds to step S503, and the dominant eye image is output to the display apparatus 106.

According to the present exemplary embodiment described above, although the observer does not explicitly input which one of the right and left eyes is the dominant eye, the dominant eye image determined by the system is displayed on another display apparatus different from the HMD 101. For example, even if the observer is not aware of the dominant eye of the observer, a suitable dominant eye image is shared with the audience.

First Modified Example of Second Exemplary Embodiment

In the second exemplary embodiment, the system determines an image corresponding to the dominant eye based on features of the right and left images acquired by the observer by viewing the reference virtual object. In the second exemplary embodiment, however, the reference virtual object does not have a material substance (a corresponding real object in the real world). On the contrary, a first modified example of the second exemplary embodiment will be described below in which the reference virtual object is generated based on an object in a predetermined real space and the system determines an image corresponding to the dominant eye. The observer causes the system to determine a dominant eye image using, for example, a hand of the observer. Mainly differences from the above-described exemplary embodiments will be described below, and descriptions of similarities are sometimes omitted.

Figure 8A:
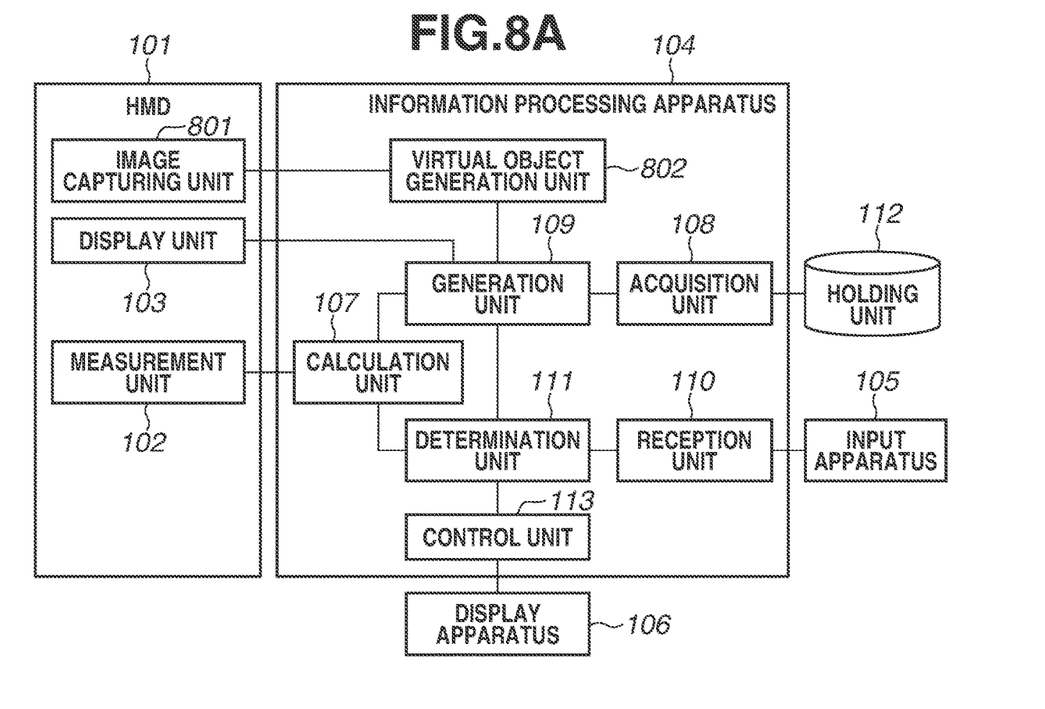
FIGS. 8A and 8B are block diagrams illustrating an example of a system configuration.

An example of a system configuration according to the present modified example will be described below with reference to a block diagram in FIG. 8A. While not described in the first and second exemplary embodiments, the system is to allow the observer to experience mixed reality, and the HMD 101 includes an image capturing unit 801 configured to capture images of the real space. Further, the information processing apparatus 104 further includes a virtual object generation unit 802. The virtual object generation unit 802 generates a virtual image (virtual object image) to be superimposed and displayed on a captured image based on a result of analyzing the captured image acquired from the image capturing unit 801.

The image capturing unit 801 captures moving images of the real space and includes an image capturing unit (right image capturing unit) that captures images to be provided to the right eye of the observer and an image capturing unit (left image capturing unit) that captures images to be provided to the left eye of the observer. Images (real space images) of frames of moving images captured by the image capturing units are sequentially transmitted to the information processing apparatus 104.

The virtual object generation unit 802 receives the images of the frames from the image capturing unit 801. The virtual object generation unit 802 measures the depth of the real object based on the images received from the left image capturing unit and the right image capturing unit using the method discussed in Japanese Patent Application Laid-Open No. 2013-134706 and generates a virtual object with the calculated position and the calculated orientation from the image capturing unit 801. For example, color information can be registered using the method discussed in Japanese Patent Application Laid-Open No. 2013-134706 so that a virtual object corresponding to the hand in the real space can be generated in the mixed reality space. A method other than those described above can be used to generate a virtual object corresponding to a real object. For example, an image capturing apparatus capable of measuring a depth can be added, and a virtual object corresponding to a real object can be generated using real object tracking and segmentation methods. The position and orientation of the generated virtual object corresponding to the real object in the virtual space coordinate system are to be calculated. Thus, a positional relationship between a point of view and the image capturing unit 801 is registered in advance in the information processing apparatus 104 so that the position and orientation of the virtual object in the virtual space coordinate system can be calculated based on the positional relationship between the point of view and the image capturing unit 801 and the virtual object.

The virtual object corresponding to the real object that is generated by the virtual object generation unit 802 is also transmitted to the generation unit 109 similarly to the virtual object generated based on the information held by the holding unit 112. The generation unit 109 combines the transmitted virtual objects together to generate a display image to be displayed on the display unit 103. In a case where a plurality of virtual objects of a real object is generated, the nearest virtual object to each point of view can be transmitted to the generation unit 109.

The determination unit 111 selects an image in which the center of gravity of the virtual object generated by the virtual object generation unit 802 is at the center of the image as an image corresponding to the dominant eye among the images of the virtual space from the points of view that are generated by the generation unit 109. Thereafter, operations similar to those of the determination unit 111 according to the second exemplary embodiment are performed.

Figure 9:
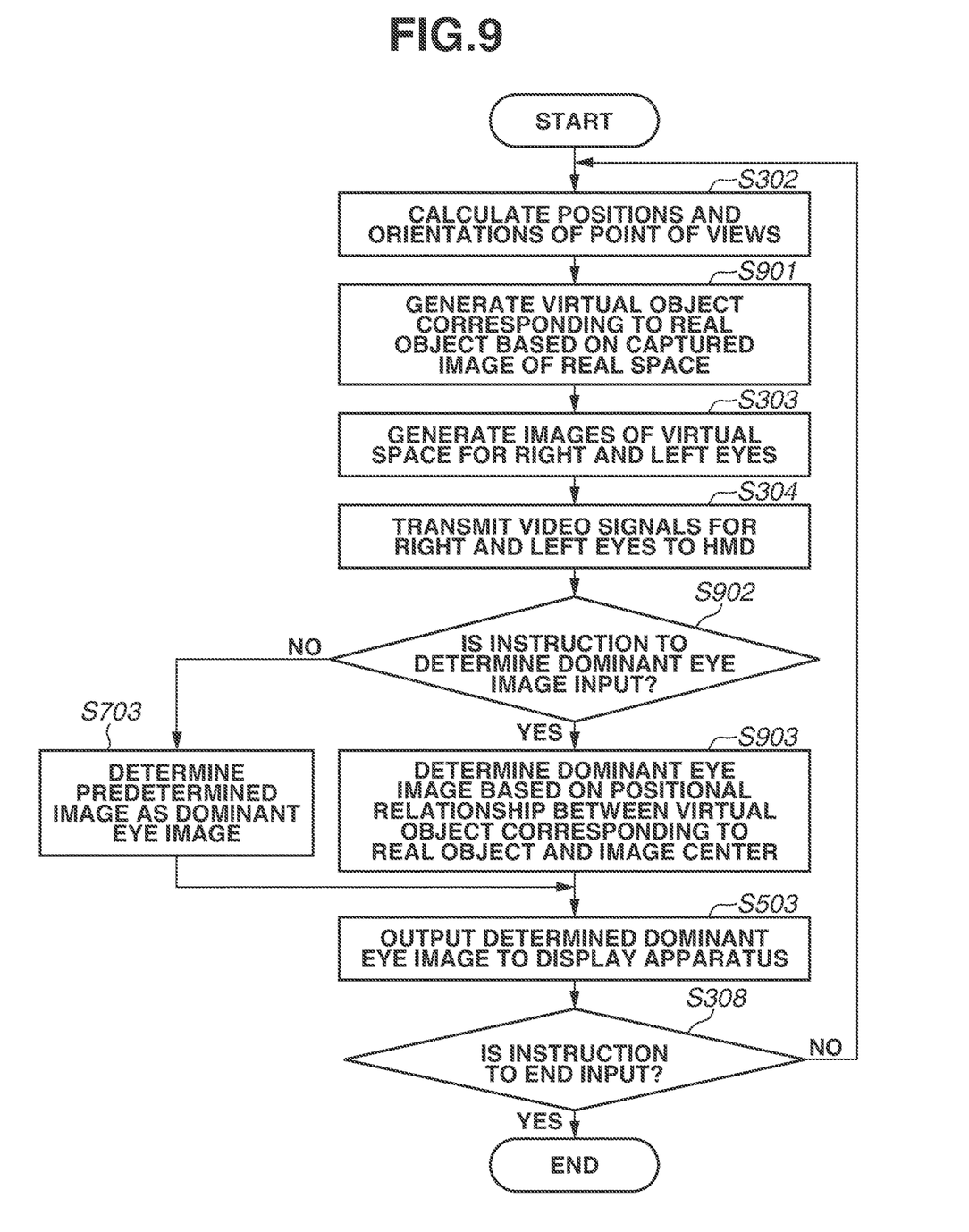
FIG. 9 is a flowchart illustrating operations of the functional units of the information processing apparatus.

FIG. 9 is a flowchart illustrating a process of the information processing apparatus 104 according to the first modified example of the second exemplary embodiment. In step S901, the virtual object generation unit 802 receives captured images of frames from the image capturing unit 801 and generates a virtual object of a real object. For example, a virtual object of the hand can be generated as described above. Thereafter, the virtual object generation unit 802 transmits the virtual object to the generation unit 109.

In step S902, it is determined whether the observer or another user operates the input apparatus 105 and inputs an instruction to cause the system to determine a dominant eye image. In a case where an instruction to cause the system to determine a dominant eye image is input (YES in step S902), the processing proceeds to step S903. On the other hand, in a case where an instruction to cause the system to determine a dominant eye image is not input (NO in step S902), the processing proceeds to step S703.

In step S903, the determination unit 111 performs processing similar to that in the second exemplary embodiment (step S702) using the generated virtual object corresponding to the real object as a reference and selects an image corresponding to a dominant eye image. Before that, in a case where a hand is generated as a virtual object, the guidance "please view your hand so that the hand is at the center of the field of view" can be displayed. In a case where the conditions specified above in step S702 in the second exemplary embodiment are not satisfied, an image corresponding to a dominant eye image does not have to be determined. In a case where a dominant eye image is not determined, the generation unit 109 can generate an image to display the message "dominant eye image is not selectable" or "selection of a dominant eye image is being executed" on the virtual space image. On the other hand, in a case where a dominant eye image is determined, the message "dominant eye image is selected" can be displayed on the virtual space image.

According to the first modified example of the second exemplary embodiment described above, although the observer does not explicitly input one of the right and left eyes as a dominant eye, the dominant eye image determined by the system is displayed on another display apparatus different from the HMD 101. Especially, the user can cause the system to determine a dominant eye image by a simple action, such as viewing an object, such as the hand of the user, in a real space.

Second Modified Example of Second Exemplary Embodiment

In the first modified example of the second exemplary embodiment, a virtual object corresponding to an object in a real space is generated, and the system determines an image corresponding to the dominant eye by the processing using the generated virtual object as a reference. On the contrary, a second modified example will be described below in which the system determines an image corresponding to the dominant eye based on an operation of the observer, such as an operation of pointing an object in a real space.

Mainly differences from the exemplary embodiments and the modified examples thereof that are described above will be described below, and detailed descriptions of similarities are omitted.

Figure 8B:
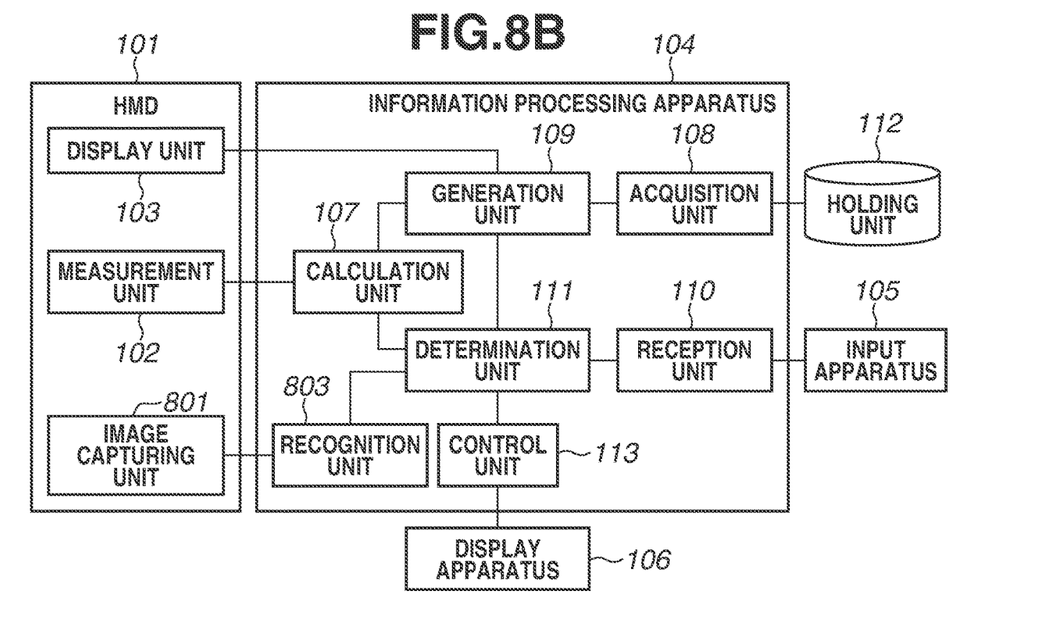

An example of a system configuration according to the second modified example will be described below with reference to a block diagram in FIG. 8B. The configuration of the information processing apparatus 104 in FIG. 8B further includes a recognition unit 803 configured to recognize an object in the real space based on a captured image acquired from the HMD 101.

The recognition unit 803 receives images of frames from the image capturing unit 801. The recognition unit 803 recognizes a reference real object from the received images of the left image capturing unit and the right image capturing unit. The reference real object is to be at a distance greater than or equal to a threshold value from the HMD 101. Furthermore, for example, a real object having a specific color can be determined as a target from images captured by the image capturing unit 801. In a case where the specific color is a color that is not in the real space where the observer is, the recognition processing is facilitated. The threshold value can be set to a distance that cannot be reached by the hand of the HMD wearer. In a case where there is a plurality of real objects in the field of view of the HMD 101, the nearest object to the HMD 101 among the objects that are at a distance greater than or equal to the threshold value from the HMD 101 or the nearest object to the image centers of both of the images for the right and left eyes can be determined as a reference real object. As to a method of recognizing a real object from a captured image, template matching can be used, or any other methods can be used such as a recognition method by deep learning. Information for recognizing the reference real object can be registered in advance in the information processing apparatus 104. In recognizing an object by template matching, images of a target real object that are captured at a plurality of points are registered. In recognizing an object by deep learning, learning information for the recognition can be registered in the information processing apparatus 104.

Figure 6B:
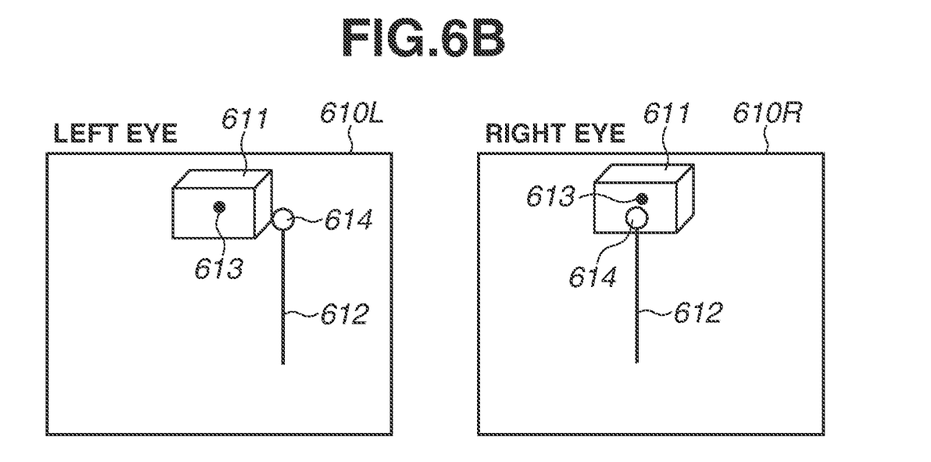

Further, in the second modified example, a tip at the time when the HMD wearer points at the reference real object in the real space is recognized. For example, images 610L and 610R in FIG. 6B are frame images captured by the image capturing unit 801. The image 610L is an image for the left eye, and the image 610R is an image for the right eye. The images 610L and 610R both contain a real object 611 and a pointer 612. In a case where the reference real object is pointed with the pointer 612 as in the images 610L and 610R, the system recognizes a tip 614 of the pointer 612. A tip of anything other than the pointer 612 that can point an object can be used, such as the tip of a finger of the HMD wearer. As described above, the recognition unit 803 recognizes the target real object and the tip of the object used to point the reference real object by the HMD wearer.

In the second modified example, the determination unit 111 determines an image corresponding to the dominant eye based on the positional relationship between the real object recognized by the recognition unit 803 and the tip of the object used to point the reference real object by the HMD wearer. Specifically, an image in which the tip 614 used to point the reference real object 611 by the HMD wearer is present nearer to a center 613 of the reference real object 611 as illustrated in the images 610L and 610R is determined as an image corresponding to the dominant eye. In the images 610L and 610R, the tip 614 and the center 613 of the real object 611 are nearer to each other in the image 610R for the right eye. The image 610R is therefore selected. In this way, the system determines an image corresponding to the dominant eye.

Figure 10:
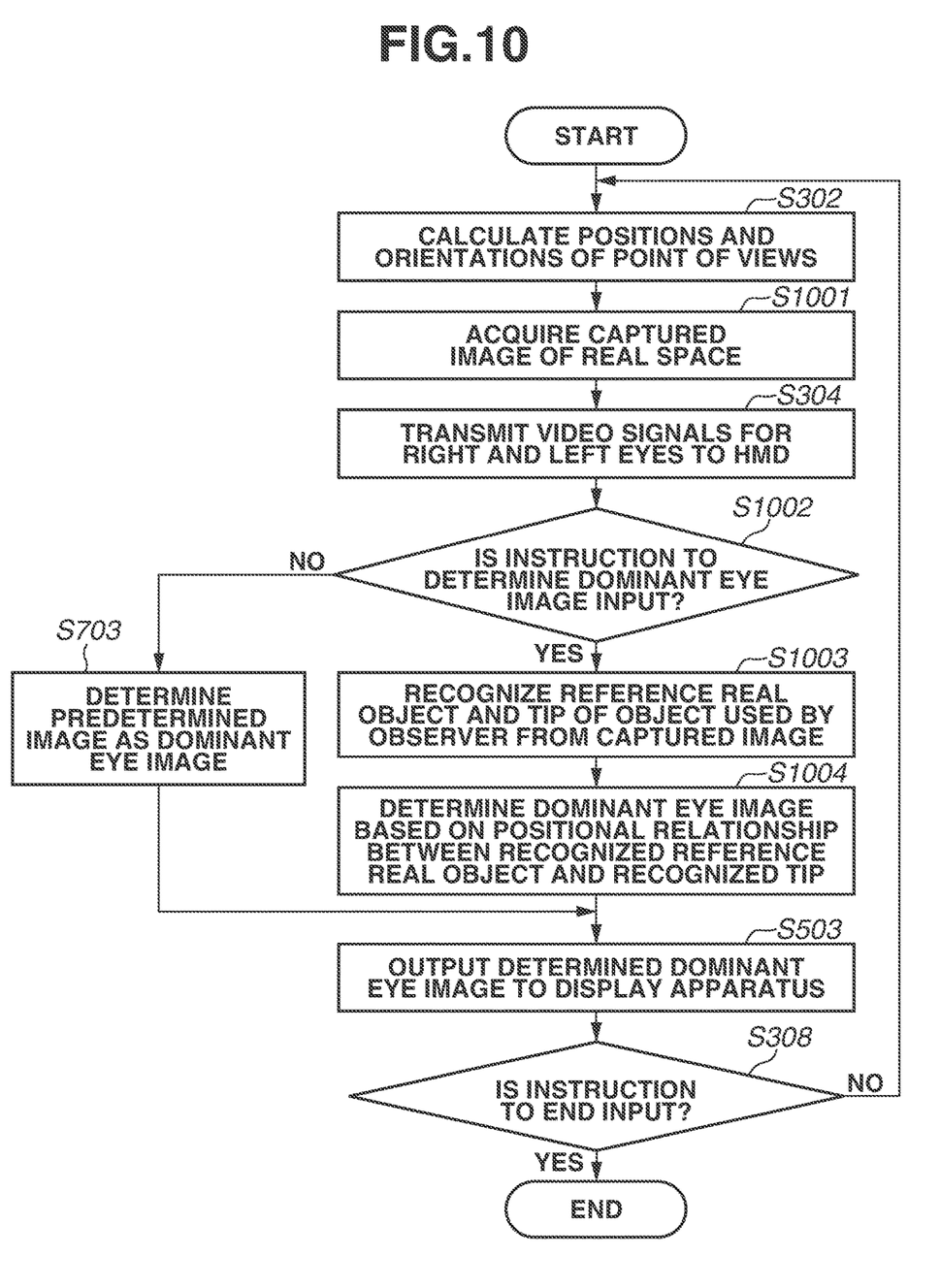
FIG. 10 a flowchart illustrating operations of the functional units of the information processing apparatus.

FIG. 10 is a flowchart illustrating a process of the information processing apparatus 104 according to the second modified example of the second exemplary embodiment. Redundant descriptions of steps similar to those in FIG. 7 or 9 are omitted. In step S1001, the recognition unit 803 acquires images of frames from the image capturing unit 801. In step S1002, it is determined whether the observer or another user operates the input apparatus 105 and inputs an instruction to cause the system to determine a dominant eye image. In a case where an instruction to cause the system to determine a dominant eye image is input (YES in step S1002), the processing proceeds to step S1003. On the other hand, in a case where an instruction to cause the system to determine a dominant eye image is not input (NO in step S1002), the processing proceeds to step S703.

In step S1003, the recognition unit 803 recognizes a target real object and a tip of an object used to point a reference real object by the HMD wearer as described above. In step S1004, the determination unit 111 determines an image corresponding to the dominant eye based on the positional relationship between the recognized reference real object and the recognized tip. In a case where the recognition unit 803 fails to recognize the tip of the object used to point the reference real object by the observer in step S1003, the guidance "please point a target object and stop" can be displayed.

According to the second modified example of the second exemplary embodiment described above, although the observer does not explicitly input one of the right and left eyes as a dominant eye, the dominant eye image determined by the system is displayed on another display apparatus different from the HMD 101. Especially, the user can cause the system to determine a dominant eye image by a simple action, such as viewing an object in a real space such as the hand of the user.

Among the processing units described in the second exemplary embodiment and the modified examples thereof, the determination unit 111 can be replaced by a model trained by machine learning. In this case, for example, a plurality of combinations of the display images for the right and left eyes that are data input to the determination unit 111 and dominant eyes (or dominant eye images) of determination results is prepared as learning data, and knowledge is acquired from the plurality of pieces of learning data by machine learning. Then, based on the acquired knowledge, a trained model that outputs output data with respect to input data as a result is generated. Further, in a case where, for example, a user operation to correct a determination result is received, a corrected result can be used as training data to re-learn the trained model. The trained model can be, for example, a neural network model. Then, the trained model operates as a program for executing processing equivalent to that of the processing unit in cooperation with a CPU or GPU to perform the processing of the processing unit. The trained model can be updated after predetermined processing as needed.

Other Exemplary Embodiments

While the information processing systems in which the HMD 101, the information processing apparatus 104, and the display apparatus 106 are independent of each other are described in the exemplary embodiments and the modified examples thereof, configurations of information processing systems, to which the exemplary embodiments are applicable, are not limited to those described above. For example, the HMD 101 may include the function of the information processing apparatus 104 therein. In this case, the HMD 101 determines a dominant eye image and provides the dominant eye image to the display apparatus 106 by a wired or wireless communication method, and the display apparatus 106 is controlled to display the display apparatus 106. Alternatively, the information processing apparatus 104 can be a server apparatus.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-027360, filed Feb. 20, 2020, which is hereby incorporated by reference herein in its entirety.

What is claimed is:

1. An apparatus connected to a first display apparatus of head mounted type including a right eye display for a right eye and a left eye display for a left eye and to a second display apparatus that is not of head mounted type, the apparatus comprising:
   at least one processor; and
   a memory coupled to the at least one processor, the memory having instructions that, when executed by the processor, performs operations as:
   a determination unit configured to determine an image from among a right eye image to be displayed on the right eye display and a left eye image to be displayed on the left eye display based on information about a dominant eye of a wearer of the first display apparatus; and
   a control unit configured to control the second display apparatus to display only the determined image among the right eye image and the left eye image,
   wherein the right eye image and the left eye image have a difference due to parallax, and
   wherein the control unit controls the first display apparatus and the second display apparatus so that the right eye image, the left eye image and the determined image are displayed simultaneously.

2. The apparatus according to claim 1, wherein the information about the dominant eye of the wearer of the first display apparatus is set by an operation input using an input apparatus.

3. The apparatus according to claim 2, wherein the processor further performs operations as a reception unit configured to receive an operation of selecting an image from a plurality of images displayed on the right eye display and the left eye display,
   wherein the determination unit determines the determined image based on information about the selected image.

4. The apparatus according to claim 2,
   wherein the processor further performs operations as a reception unit configured to receive an operation of selecting one of the right eye and the left eye as the dominant eye using the input apparatus, and
   wherein the determined image is an image determined based on information about the dominant eye selected by the received operation.

5. The apparatus according to claim 4,
   wherein the first display apparatus further includes a unit configured to detect a line-of-sight direction of the wearer, and wherein the determined image is an image to be displayed on a display being the right eye display or the left eye display and being at a position in a line-of-sight direction of an eye of the wearer selected as the dominant eye by the received operation.

6. The apparatus according to claim 4, wherein the determined image is an image to be displayed on a display being the right eye display or the left eye display and being at a nearest position to an eye of the wearer selected as the dominant eye by the received operation.

7. The apparatus according to claim 1,
wherein the information about the dominant eye of the wearer of the first display apparatus is information about a difference in a plurality of images to be displayed on the right eye display and the left eye displays.

8. The apparatus according to claim 7,
wherein the first display apparatus includes a measurement unit configured to measure a physical quantity of a position and an orientation of the first display apparatus,
wherein the processor further performs operations as:
a generation unit configured to generate an image of a virtual object viewed from a point of view corresponding to the position and the orientation of the first display apparatus based on a result of the measurement by the measurement unit,
wherein the control unit displays the generated image of the virtual object at a position corresponding to the position and the orientation of the first display apparatus on each of the right eye display and the left eye display,
wherein the determined image is an image determined based on a difference in a position of an image of a reference virtual object in the plurality of images displayed on the right eye display and the left eye display and in which the position satisfies a predetermined condition.

9. The apparatus according to claim 8, wherein the determined image is an image in which the reference virtual object is displayed nearer to a center of the image among the plurality of images displayed on the right eye display and the left eye display.

10. The apparatus according to claim 8,
wherein the first display apparatus includes a capturing unit configured to capture an image of a real space, and
wherein the image of the virtual object is combined with the image of the real space that is captured by the capturing unit.

11. The apparatus according to claim 10, wherein the reference virtual object is generated to correspond to a predetermined real object detected from the captured image of the real space.

12. The apparatus according to claim 11, wherein the predetermined real object is a hand of the wearer of the first display apparatus.

13. The apparatus according to claim 7,
wherein the first display apparatus includes:
a measurement unit configured to measure a physical quantity of a position and an orientation of the first display apparatus; and
a capturing unit configured to capture an image of a real space correspondingly to each of the right eye display and the left eye display,
wherein the processor further performs operations as:

a recognition unit configured to recognize a predetermined object contained in the image of the real space that is captured by the capturing unit,
wherein the control unit performs control to display the image of the real space on each of the right eye display and the left eye displays at a position on the display based on the position and the orientation of the first display apparatus, the captured image of the real space corresponding to the display,
wherein the determined image is an image in which a positional relationship of the recognized predetermine object satisfies a predetermined condition and which is determined, from among the plurality of images displayed on the right eye display and the left eye display, based on a difference in the positional relationship thereamong.

14. The apparatus according to claim 13,
wherein the recognition unit recognizes a reference real object and a tip of an object used to point the reference real object by the wearer of the first display apparatus from real objects contained in the image of the real space, and
wherein the determined image is an image in which the reference real object and the tip of the object are nearer to each other and which is determined from among the plurality of images displayed on the right eye display and the left eye display.

15. A method of an apparatus connected to a first display apparatus of a head mounted type including a right eye display for a right eye and a left eye display for a left eye and to a second display apparatus that is not of head mounted type, the method comprising:
determining an image from among a right eye image to be displayed on the right eye display and a left eye image to be displayed on the left eye display based on information about a dominant eye of a wearer of the first display apparatus; and
controlling the second display apparatus to display only the determined image among the right eye image and the left eye image,
wherein the right eye image and the left eye image have a difference due to parallax, and
wherein the controlling controls the first display apparatus and the second display apparatus so that the right eye image, the left eye image and the determined image are displayed simultaneously.

16. A non-transitory computer-readable storage medium storing a program that causes a computer to function as:
a determination unit configured to determine an image from among a right eye image to be displayed on the right eye display and a left eye image to be displayed on the left eye display based on information about a dominant eye of a wearer of a first display apparatus of a head mounted type including the right eye display for a right eye and the left eye display for a left eye; and
a control unit configured to control a second display apparatus that is not of head mounted type to display only the determined image among the right eye image and the left eye image,
wherein the right eye image and the left eye image have a difference due to parallax, and
wherein the control unit controls the first display apparatus and the second display apparatus so that the right eye image, the left eye image and the determined image are displayed simultaneously.

* * * * *